United States Patent
Verma et al.

(10) Patent No.: US 11,108,628 B2
(45) Date of Patent: Aug. 31, 2021

(54) LINKING MULTIPLE ENROLLMENTS ON A CLIENT DEVICE

(71) Applicant: VMware, Inc., Palo Alto, CA (US)

(72) Inventors: Gaurav Verma, Bangalore (IN); Suchit Shivashankar, Bangalore (IN); Karthikeyan Palanisamy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/850,648

(22) Filed: Apr. 16, 2020

(65) Prior Publication Data

US 2020/0244523 A1 Jul. 30, 2020

Related U.S. Application Data

(63) Continuation of application No. 15/892,415, filed on Feb. 9, 2018, now Pat. No. 10,659,294.

(30) Foreign Application Priority Data

Nov. 15, 2017 (IN) .............................. 201741040824

(51) Int. Cl.
*H04L 12/24* (2006.01)
*H04L 29/08* (2006.01)

(52) U.S. Cl.
CPC ...... *H04L 41/0806* (2013.01); *H04L 41/0893* (2013.01); *H04L 67/125* (2013.01); *H04L 67/16* (2013.01); *H04L 67/303* (2013.01); *H04L 67/34* (2013.01)

(58) Field of Classification Search
CPC .... H04L 41/0806; H04L 67/16; H04L 67/303
USPC ........................................................ 709/222
See application file for complete search history.

(56) References Cited

U.S. PATENT DOCUMENTS

| | | | |
|---|---|---|---|
| 2017/0250977 A1* | 8/2017 | Turner | H04W 12/102 |
| 2018/0131721 A1* | 5/2018 | Jones | H04L 63/0861 |
| 2018/0276386 A1* | 9/2018 | Roszak | G06F 8/61 |
| 2020/0364726 A1* | 11/2020 | Avary | G06Q 30/018 |

* cited by examiner

*Primary Examiner* — Glenford J Madamba
(74) *Attorney, Agent, or Firm* — Thomas Horstemeyer, LLP

(57) ABSTRACT

Disclosed are various examples for facilitating enrollment of a client device into more than one management framework. A client device can be enrolled with a management service as a fully managed device. The client device can also be enrolled with the management service as a personal or bring-your-own-device (BYOD), which causes a workspace to be created on the device that is segregated from the rest of the client device. Both enrollments can be managed by a remotely executed management service.

17 Claims, 4 Drawing Sheets

LINKING MULTIPLE ENROLLMENTS ON A CLIENT DEVICE

CROSS-REFERENCE TO RELATED APPLICATIONS

Benefit is claimed under 35 U.S.C. 119(a)-(d) to Foreign Application Serial No. 201741040824 filed in India entitled "LINKING MULTIPLE ENROLLMENTS ON A CLIENT DEVICE", on Nov. 15, 2017, by VMware, Inc., which is incorporated herein in its entirety by reference for all purposes. This application is a continuation of and claims priority to application Ser. No. 15/892,415, filed on Feb. 9, 2018 and titled "LINKING MULTIPLE ENROLLMENTS ON A CLIENT DEVICE," which is incorporated herein in its entirety by reference for all purposes.

BACKGROUND

Smartphones and other devices running operating systems that provide administrative management capabilities have become ubiquitous and essential to users, both for personal and enterprise uses. Client devices issued by an enterprise can be managed by a management service that provides the ability to remotely manage or administer devices that are enrolled with the management service as a managed device. For example, devices can be enrolled with a remotely executed management service using application programming interfaces (APIs) or other capabilities that are embedded within the operating system of the device. A management component can also be installed on a client device so the device can be locally managed by the management component and remotely managed by the management service.

Various original equipment manufacturers (OEMs) provide management capabilities that are embedded into the operating system or operating system variant installed by the OEM on their respective devices. These management capabilities are often layered atop the management capabilities provided by the operating system and can vary from OEM to OEM. Additionally, the operating system can provide its own management capabilities that allow the device to be managed by another management service. For example, Android for Work™, which is also sometimes referred to as Android Enterprise™ is a framework provided by the Android® operating system that allows a user to enroll his or her device with a management service so that the device, or at least certain portions or certain data partitions on the device, can be managed by administrators of the management service.

The framework can allow an administrator to configure enterprise profiles for BYOD devices or configure devices that are owned or issued by the enterprise to users. The framework can also provide for remote management of enterprise profiles, applications, and data, as well as the ability to remotely alter or delete data on the device without affecting the user's personal applications and data. In some cases, the operating system management capabilities provide the ability to create a container on the device in which managed applications and data can be stored separate from the unmanaged applications and data on the device. In current systems, there is not a feasible way to utilize both OEM management capabilities and OS management capabilities at the same time on the same device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

BRIEF DESCRIPTION OF THE DRAWINGS

Figure 1:
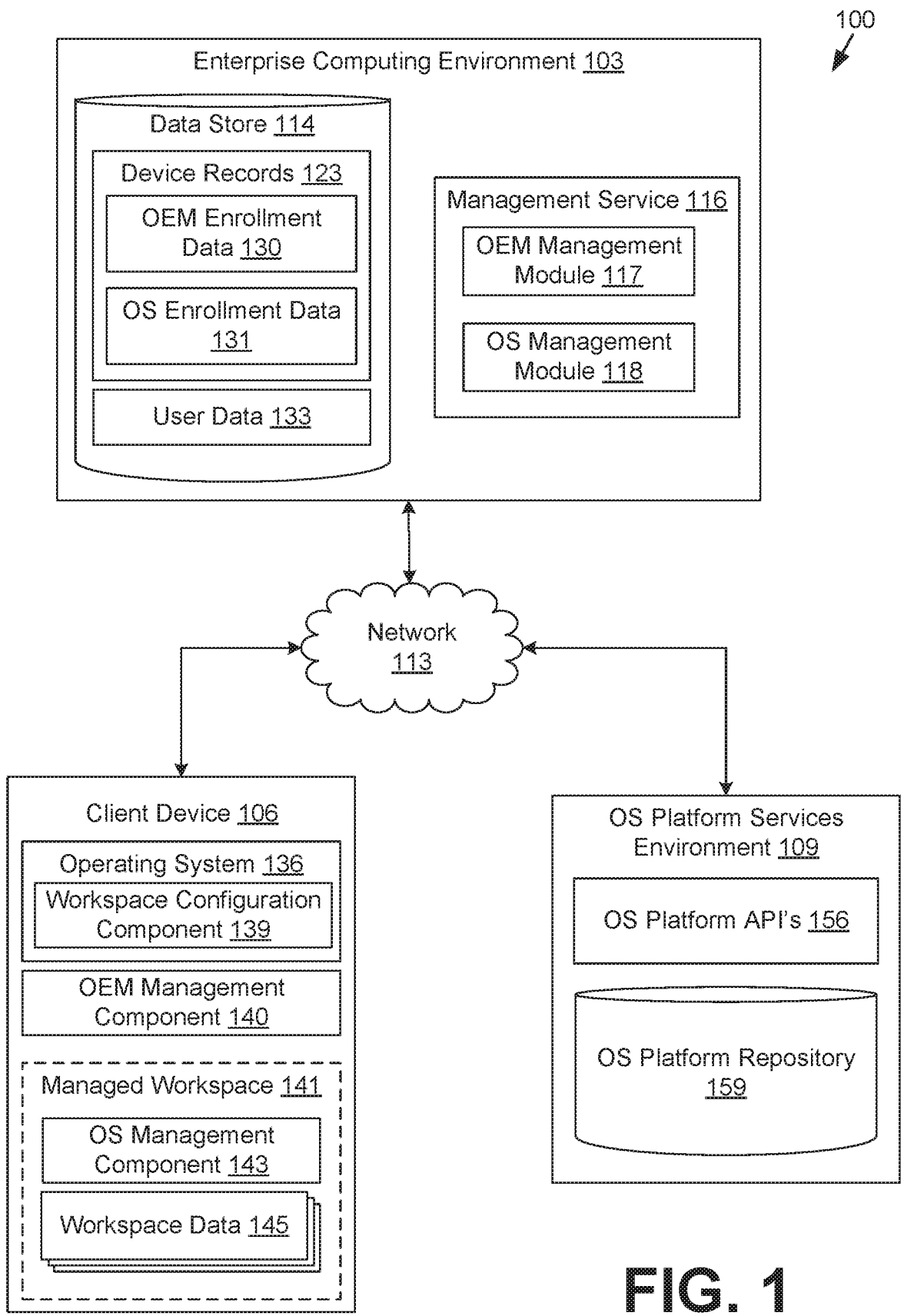
FIG. 1 is a schematic block diagram depicting an example implementation according to various examples of the disclosure.

Disclosed are various examples of systems that enable enrollment of a user device into more than one management framework. As noted above, users of an enterprise can be issued devices or allowed by the enterprise to use their personal devices to access enterprise resources, such as a corporate network, email, documents, contacts, and other resources. Additionally, an enterprise might have a library of applications that are available for use by its users to access certain data.

In an enterprise environment, devices can be enrolled with a management service using application programming interfaces (APIs) or other capabilities that are embedded within the operating system of the device. A management component can also be installed on a client device so the device can be locally managed by the management component and remotely managed by the management service.

As noted above, original equipment manufacturers (OEMs) often provide management capabilities that are embedded into the operating system or operating system variant installed by the OEM on their respective devices. Examples of an OEM management capability can include Samsung application programming interfaces (APIs) that are provided by the operating system 136 that is distributed by the OEM. Another example can be management APIs provided by LG on LG Android® devices. These management capabilities can be provided in addition to the default management capabilities provided by the operating system, such as the Android™ operating system, that are common to client devices 106 regardless of the particular OEM of the device. An example of an OS management capability can include Android for Work™, which is a framework provided by the Android™ operating system that allows a user to enroll his or her device with a management service so that the device, or at least certain portions or certain data partitions on the device, can be managed by administrators of the management service. In the Android scenario, the OS management capability is universal between OEM's that manufacture devices that run the operating system, but OEM's will often create their own management API's and capabilities that are layered atop the operating system or included in a customized version of the operating system that is created by the OEM.

The framework can allow an administrator to configure enterprise profiles for BYOD devices or configure devices that are owned or issued by the enterprise to users. The framework can also provide for remote management of enterprise profiles, applications, and data, as well as provide the ability to remotely alter or delete data on the device without affecting the user's personal applications and data. In some cases, the operating system management capabilities provide the ability to create a container on the device in which managed applications and data can be stored separate from the unmanaged applications and data on the device. Accordingly, an administrator might wish to take advantage of capabilities of an OEM management capability as well as an operating system capability.

However, enrollment of a device into more than one management service is often impossible with many management services that are offered as on-premises or hosted solutions. In many instances, management services that are offered to enterprises only allow enrollment into one management framework, whether it is the OEM management capability or OS management capability. Accordingly, examples of this disclosure allow a user device, whether it is a BYOD or an enterprise owned device, to be enrolled with a management service that provides OEM management capabilities as well as OS management capabilities. In effect, the client device is enrolled in multiple management services because a management service according to this disclosure can provide the management functionality that is provided by both forms of management services.

According to examples of this disclosure, a client device 106 that is managed by the management service is enrolled at a device-level into a management service that provides OEM management capabilities. The client device can also be enrolled with the management service a second time so that OS management capabilities are also provided. Enrollment into the management service under the OS management framework can cause a managed workspace to be created that is associated with a separate device identifier than the client device. The managed workspace can also be segregated from the resources of the client device and inaccessible by applications that are external to the managed workspace.

This methodology provides a way for multi-user devices to be used in an enterprise. In this scenario, the device applications, configurations, and policies that are universal to all users can be managed by the OEM management capabilities of the device and housed external to a segregated managed workspace. When a user logs into the client device, a managed workspace can be created by and managed by the OS management capabilities of the device. When the user logs out or when a subsequent users logs in, this managed workspace can be deleted from or protected by the device from the subsequent users. However, other applications, policies, or profiles that are deployed to the client device through the OEM management channel remain on the device even after this managed workspace is deleted from the client device.

In addition to providing multi-user capabilities, an administrator within an enterprise may wish to provide for an enrollment that allows the administrator to manage the devices in ways that are enabled by the OEM management capabilities and the OS management capabilities. For example, certain management tasks can be performed only through the OEM management channel and others can be performed only through the OS management channel. Accordingly, examples of the disclosure can provide a more complete management framework for an administrator by enabling both management channels for the administrator.

An administrator can setup and deploy applications to a device that he or she is preparing to issue to a user using operating system APIs that allow the device to be enrolled as a managed device. In either scenario, an administrator can configure enterprise profiles for BYOD devices or configure devices that are owned or issued by the enterprise to users and deploy applications to the device that are needed by users of the enterprise. The framework APIs can also provide for remote management of the device, which can include the ability to remotely alter or delete data on the device without affecting the personal applications and data of the user.

Administrators for a given enterprise can deploy various applications, profiles, or settings to client devices, whether the client devices are BYOD devices or issued by the enterprise. Additionally, many of the applications might be applications that are made by third parties and that are available from a publicly accessible application marketplace, such as the Apple iTunes App Store® or the Google Play Store®. OEM management or OS management capabilities can allow the administrator to remotely deploy an application to a client device from a publicly accessible application marketplace. Additionally, profiles or settings can include information such as WiFi credentials, single sign-on profiles, email profiles, or other credentials that facilitate use of the client device within the enterprise.

In some scenarios, OS management capabilities are tied to the identity of a user who is associated with the client device. Additionally, OEM management capabilities can be tied to the device itself and not dependent upon the identity of the user. Many OEM management frameworks can require administrator action to enroll the device into the OEM management framework.

Examples of the disclosure can also improve the functioning of an enterprise computing environment that manages the client devices of users by improving the mechanism through which client devices are enrolled with a management service. Examples of this disclosure can allow a client device to be enrolled with a management service that provides multiple forms of device management or enrollment with multiple management services.

FIG. 1 illustrates an example of a networked environment 100 according to examples of the disclosure. In the depicted network environment 100, an enterprise computing environment 103 is in communication with at least one client device 106 and an operating system (OS) platform services environment 109 over a network 113.

The network 113 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Applications or other functionality can be executed in the enterprise computing environment 103 according to examples. Also, data can be stored in a data store 114 that can be accessible to the enterprise computing environment 103. The data store 114 can be representative of a plurality of data stores 114. The data stored in the data store 114 can be associated with the operation of the applications or functional entities described below.

The components executed on the enterprise computing environment 103 can include a management service 116 and other applications, services, processes, systems, engines, or functionality not discussed in detail herein. The management service 116 can be executed in the enterprise computing environment 103 to monitor and oversee the operation of one or more client devices 106. In some examples, the management service 116 can facilitate the administration of client devices 106 by administrators. For instance, the management service 116 can include a management console that generates user interfaces that can allow administrators to operate and interact with the management service 116. The user interfaces can allow an administrator to define policies for a user account or devices associated with an enterprise environment. The user interfaces can also include, for example, presentations of statistics or other information regarding the client devices 106 that can be managed by the management service 116.

Client devices 106 can be enrolled with the management service 116 as fully or partially managed devices. As noted above, operating system APIs provided by a client device 106 can allow the client device 106 to be remotely managed by a management service 116. In this sense, the management service 116 is executed remotely from the client device 106. The APIs can allow the management service 116 to manage a client device 106 by providing the ability to push profiles, policies, and applications to the client device 106. In some scenarios, such as in the case of a BYOD device, the APIs allow the management service 116 to manage a managed workspace of the client device without managing other aspects of the client device 106 where a user might store personal data and applications.

The management service 116 can also execute an OEM management module 117 and an OS management module 118. The OEM management module 117 can be functionality of the management service 116 that provides device management capabilities according to an OEM management framework. The OEM management module 117 can communicate with an OEM management component 140 that is installed on the client device 106 that implements the OEM management framework on the client device 106. The OEM management framework can take the form of APIs provided on the client device 106 that are provided by and specified an OEM of a particular client device 106.

For example, a Samsung® device can provide APIs with which an application installed on the client device 106 as the local device administrator can manage the Samsung device. As another example, an LG® device can have different APIs on the client device with which an application installed as the local device administrator can manage the LG device. The APIs provided on the client device 106 in the above scenarios can vary depending upon the APIs implemented by the OEM. The OEM management module 117 can be instrumented to manage devices according to the management capabilities provided by the various OEMs of client devices 106.

The OS management module 118 can provide management capabilities that are provided by the operating system of the client device 106. For example, an LG device and a Samsung device can both execute the Android operating system. The Android operating system can provide OS management capabilities that allow the device to be managed by a management service 116 that can interact with an OS management component 143 that is installed on the client device 106.

Android for Work, which is also sometimes referred to as Android Enterprise, can provide management capabilities through the Android operating system that are consistent regardless of the OEM management capabilities. Android Enterprise, in many cases, can provide full device management capabilities that can be utilized in environments where enterprise owned or enterprise issued devices are managed by an enterprise. In this sense, full device management capabilities means that a management service with which the client device 106 is enrolled can exercise control over all data that is on the client device 106. In a full device management scenario, no aspects of the client device 106 are left unmanaged by the management service 116.

In examples of this disclosure, the OS management capabilities of Android Enterprise that are utilized involve management of client devices 106 in a bring-your-own-device (BYOD) mode rather than a full device management mode. In a BYOD mode, a managed or enterprise workspace is created on the client device 106 that is managed by the management service 116 along with data and applications that are stored within the managed workspace. However, data outside of the managed workspace of the client device 106 is not managed by the management service with which the client device 106 is enrolled in BYOD mode.

The OS management component 143 can be installed within a managed workspace 141 or container on the client device 106 that is segregated from other storage areas on the client device 106. The OEM management component 140 and the OS management component 143 can be the same application installed in different areas of the client device 106 that perform management of the client device 106 in different contexts. For example, the OEM management component 140 can manage the client device 106 as a fully managed device, and the OS management component 143 can manage the device in BYOD mode.

In examples of this disclosure, a client device 106 is enrolled as a fully managed device using the OEM management capabilities. The client devices 106 can be enrolled using the OEM management capabilities with the OEM management module 117 as fully managed, enterprise-owned, or enterprise-issued devices. The client devices 106 are also enrolled using the OS management capabilities with the OS management module 116 in BYOD management mode, or as user-owned or BYOD devices.

The contrast between the above two management modes is as follows. As an enterprise-owned or enterprise-issued device, the client device 106 is under full device management by the management service 116 so that the management service 116 can control all applications and data on the device using the OEM management module 117. In contrast, in a BYOD management mode, the OS management module 118 can exercise control over applications and data within a managed workspace that is segregated from the rest of the client device 106. In this way, applications that are external to the managed workspace cannot access information or data that is stored within the managed workspace. In some scenarios, the OEM management module 117 or its agent on the client device 106 can delete the managed workspace but not access data stored within the managed workspace.

The client device 106 can represent multiple client devices 106 coupled to the network 113. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user. The client device 106, in some cases, can also be a computing device that is considered a BYOD device, or a personal device of a user that the user has enrolled with the management service 116.

The client device 106 can execute an operating system 136 that includes a workspace configuration component 139. The workspace configuration component 139 includes logic that interacts with the management service 116 to monitor and manage data, software components, and hardware components on the client device 106 that are associated with a managed workspace 141 on the client device 106. The workspace configuration component 139 executed on the client device 106 can create or delete managed workspaces 141 on the client device 106 on behalf of the management service 116. The workspace management component 139 can also install management profiles that cause the operating system 136 to initiate enrollment of the device with a management service 116 or cause the operating system 136 to install an application on the client device 106.

The workspace management component 139 can also install device configuration information, such as virtual private network (VPN) configuration information, network authentication information, wireless network configuration, identity or security certificates that are installed on the device, or other configuration profiles. The workspace management component 139 can also install applications on the client device 106 on behalf of the management service 116.

In some examples, the functionality of the workspace management component 139 can be embedded within the operating system 136 of the client device 106 and exposed to the management service 116 through APIs with which the management service 116 can interact. In other examples, the workspace management component 139 can be implemented as a part of functionality of a standalone application executed by the client device 106. For example, the client device 106 can execute a standalone application that facilitates management of the client device 106 by the management service 116 and enforcement of compliance policies that are sent to the client device 106 by the management service 116.

The OEM management component 140 can be an application that provides OEM management capabilities on the client device 106. The OEM management component 140 can communicate with the management service 116 and provide the OEM management capabilities on the client device 106. For example, the OEM management component 140 can deploy applications, policies, and configuration profiles, as well as enforce device management policies that are established by an administrator to be enforced client devices 106 that are enrolled as managed devices.

The OEM management component 140 can implement management APIs that are provided by the operating system 136 variant installed on the client device 106 by the OEM to perform management functions on the client device 106. In one example, the OEM management component 140 can have a device specific implementation of management APIs for various OEMs depending upon the client device 106 on which the OEM management component 140 is installed.

To enroll the client device 106 as a managed device with the OEM management module 117, an administrator might be required to take action to setup the enrollment, establish a device record 123 within the data store 114, associate the client device 106 with an enrollment, provide authentication credentials associated with the enrollment, or perform other steps or actions to enroll the client device 106 as a managed device. The administrator, in some cases, can setup the client device 106 as a managed device that is fully managed by the management service 116 as an enterprise-issued or enterprise-owned device.

Figure 2:
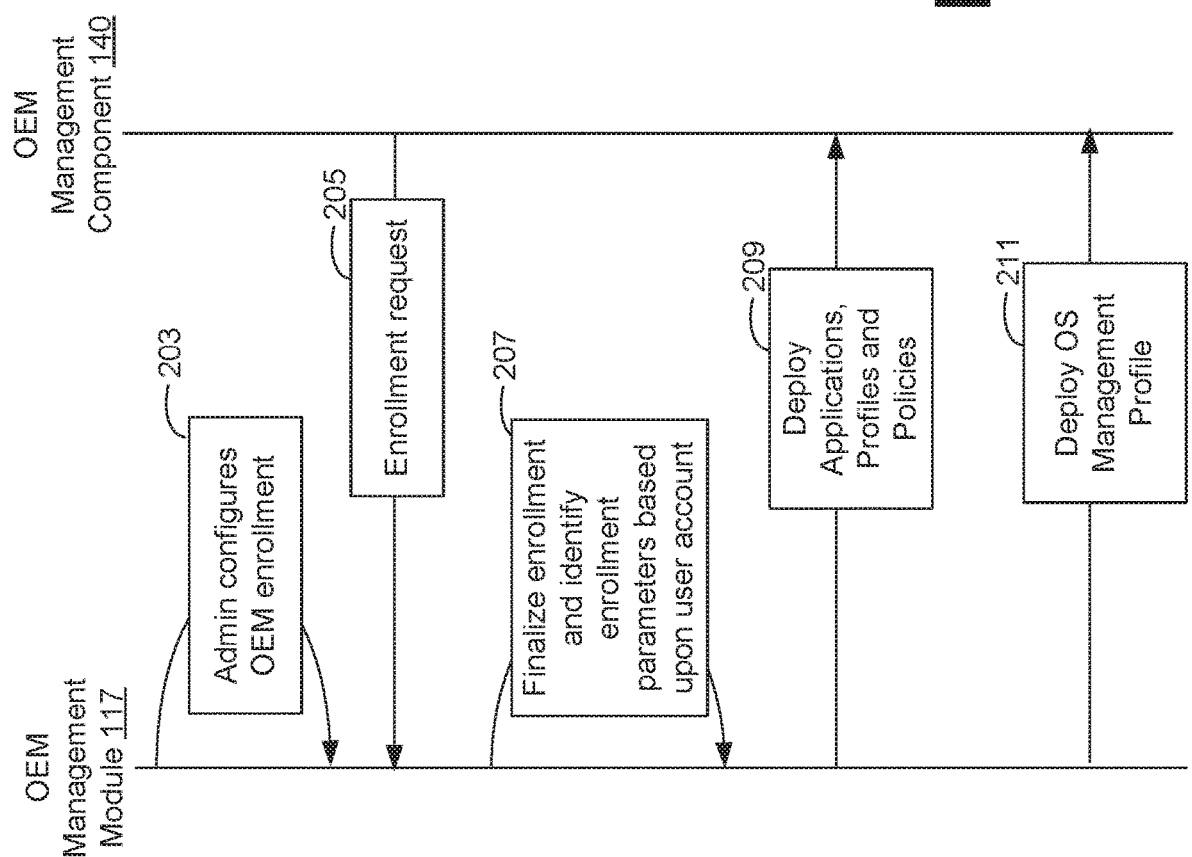
FIG. 2 is a sequence diagram illustrating interaction between components according to various examples of the disclosure.

The administrator can assign the client device 106 to organization groups that are respectively linked with the OEM management module 117 and the OS management module 118. The organization groups can exist with a directory service that can be external to the management service 116, such as an Active Directory® that is hosted by or on behalf of an enterprise. In this way, the administrator can setup the client device 106 as a dual enrollment client device 106 in that it is enrolled with the management service 116 as a fully managed device and a BYOD device. When the client device 106 is associated with the organization group that is associated with the OEM management module 117, the management service 116 can cause the client device 106 to be enrolled with the management service 116 as a fully managed device with the OEM management module 117, as illustrated in FIG. 2.

Accordingly, to enroll the client device 106 as a fully managed device, the administrator or a user can install the OEM management component 140 onto the client device 106. In one scenario, the OEM management component 140 can be obtained by the user from a public application marketplace or repository. The user can then launch the OEM management component 140, which can prompt the user for his or her credentials. The OEM management component 140 can then complete enrollment with the OEM management module 117 as a fully managed device. The OEM management component 140 can complete enrollment by interacting with operating system APIs that allow the OEM management component 140 to become the local administrator of the device upon approval of the user. Additionally, the OEM management component 140 can complete enrollment by providing the user credentials of the user to the management service 116 along with a device identifier. The OEM management module 118 can then associate the device identifier with the device record 123 that corresponds to the client device 106.

Upon enrolling the client device 106 with the OEM management module 118, the management service 116 can manage the client device 106 through a first management channel that is established with the OEM management component 140. The management service 116 can install configuration profiles, deploy applications, or issue management commands to the client device through the first management channel. The management commands can include commands to establish a managed workspace 141 on the client device 106, erase certain data from the client device, transmit compliance rules for enforcement by the OEM management component 140, or transmit a command to modify a setting or mode on the client device 106.

The administrator can also cause a configuration profile to be created that is assigned to the organization group linked with enrollment with the OS management module 118 in BYOD mode. The configuration profile can be provided to client devices 106 that are associated with the organization group that are also enrolled with the OEM management module 117. The configuration profile can include the parameters to enroll the client device 106 with the OS management module 118. The configuration profile can also include parameters that instruct the workspace management component 139 to create the managed workspace 141 on the client device 106.

The workspace management component 139 or OEM management component 140 can create the managed workspace 141 on the client device 106 in response to receiving the configuration profile. The workspace management component 139 can create copies of certain applications that are installed outside of the managed workspace 141 and install them within the managed workspace 141. The applications that are copied from outside the managed workspace 141 and installed within the managed workspace 141 can be identified by the configuration profile that is installed on the client device 106 by the OEM management component 140. Installation of the configuration profile can initiate enrollment of the client device 106 as a BYOD device with the OS management module 118. The workspace management component 139 can also create a copy of the OEM management component 140 and install it as the OS management component 143 within the managed workspace 141.

The configuration profile, or management profile, that is installed on the client device 106 by the OEM management component 140 can also include instructions from the management service 116 to enroll the device as a BYOD managed device with the management service 116. The configuration profile can initiate enrollment the device as a BYOD device even though the client device 106 is already enrolled with the management service 116 as a fully managed device through the OEM management component 140. Because, the OEM management component 140 causes installation of the OS management component 143 within the managed workspace 141, the management service 116 can support the dual enrollment of the client device 106 as a fully managed device and a device that is enrolled in a BYOD management mode.

To complete the enrollment as a BYOD device, the configuration profile that includes the instructions and parameters to complete the enrollment with the OS management module 118 can be sent to the client device 106 by the OEM management module 118 to the OEM management component 140. The OEM management component 140 can then install the configuration profile on the client device 106. The configuration profile can identify the OS management component 143 as the management component to be installed within the managed workspace 141 that can manage the managed workspace 141 on behalf of the OS management module 118. The configuration profile can also identify a server address of the OS management module 118 or management service 116. The configuration profile can also identify default applications that should be installed within the managed workspace 141 by the OS management component 143 once the enrollment of the client device 106 as a BYOD is completed.

Installation of the configuration profile can cause the operating system 136 to display a notification that the user should authenticate himself or herself to enroll the client device 106 with the OS management module 118. When the user provides authentication credentials in response to this prompt, the workspace management component 139 can generate an enrollment request that is sent to the OS management module 118 to enroll the device as a BYOD device.

In response to receiving the enrollment request, the OS management module 118 can generate a command to create a managed workspace 141 on the client device 106. The command can be sent through the OEM management channel to the OEM management component 140. Because the OEM management component 140 can have management capabilities, it can cause the workspace management component 139 or the operating system 136 to create the managed workspace 141. The command to create the managed workspace 141 can also include a command to obtain and install the OS management component 143 and other default applications that are installed within the managed workspace 141.

The workspace management component 139 or the OS management component 143, once installed within the managed workspace 141, can also install or save other workspace data 145, which can include personal data of the user, applications, settings, profiles, policies, or other data that is associated with enrollment of the client device with the OS management module 118 as a BYOD device. The workspace management component 139 or OS management component 143 can also generate a unique device identifier, or UDID, which is unique to the managed workspace 141 and different from the UDID of the client device 106. The UDID of the managed workspace 141 is associated with the enrollment of the client device 106 as a BYOD device. The UDID of the client device 106 is associated with the enrollment of the client device 106 with the OEM management module 117 as an enterprise-owned or enterprise-issued device.

Upon enrollment of the client device 106 with the OEM management module 117 as an enterprise-owned or enterprise-issued device, the OEM management module 117 can store a UDID of the client device 106, or a first device identifier, in a device record 123 that corresponds to the client device 106. The OEM management module 117 can link the UDID with an enrollment identifier that uniquely identifies the client device 106 with respect to other client devices 106 that are enrolled with the management service 116 as managed devices.

Upon enrollment of the client device 106 with the OS management module 117 as an enterprise-owned or enterprise-issued device, the OS management module 117 can store the UDID of the managed workspace 141, or a second device identifier, in the device record 123 that corresponds to the client device 106. The OS management module 117 can link the UDID of the managed workspace 141 with the enrollment identifier that uniquely identifies the client device 106 with respect to other client devices 106 that are enrolled with the management service 116 as managed devices.

The managed workspace 141 can include data storage areas of the device that are managed by the OS management module 118 of the management service 116. The management service 116 can also direct that applications be installed in the managed workspace 141 or that certain configuration profiles be installed on the client device 106 and associated with the managed workspace 141.

In this way, the client device 106 can be enrolled with the OEM management module 117 of the management service 116 as a first enrollment. The client device 106 can also be enrolled with the OS management module 118 of the management service 116 as a second enrollment and maintain separation between the areas of the device that are managed by the OS management module 118 and those that are managed by the OEM management module 117. In this way, the management service 116 can provide both OEM and OS management capabilities over a client device 106 to an administrator.

Figure 3:
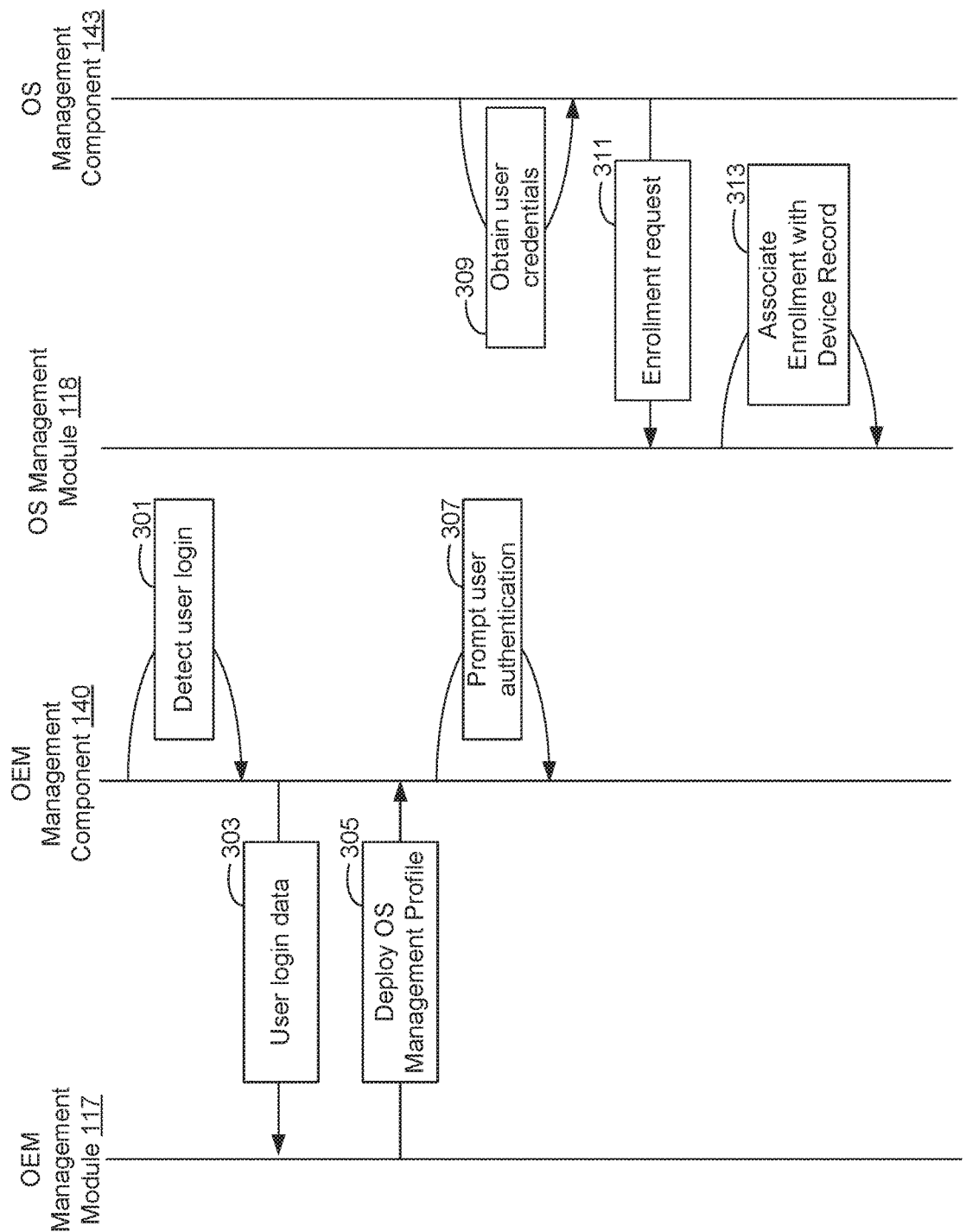
FIG. 3 is a sequence diagram illustrating interaction between components according to various examples of the disclosure.
Figure 4:
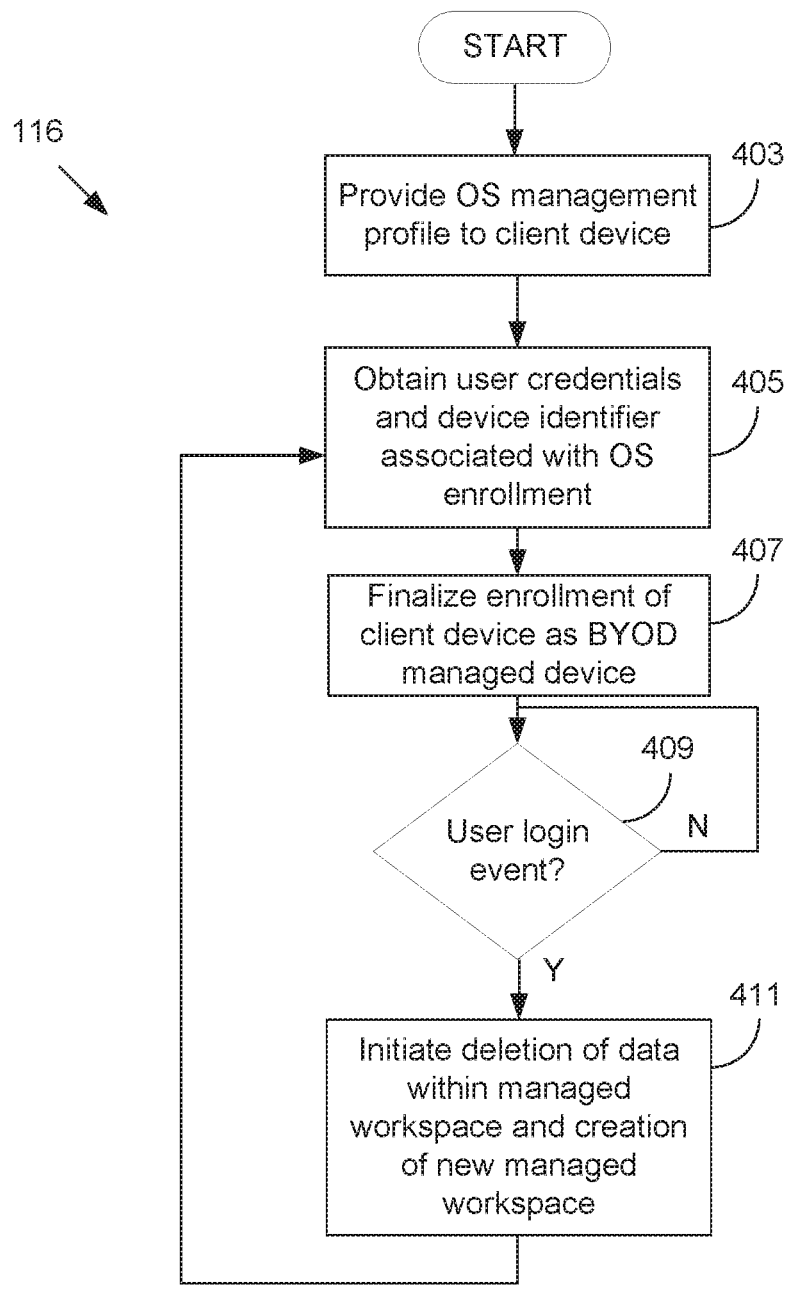
FIG. 4 is a flowchart that illustrates functionality according to examples of the disclosure.

Additional considerations and detail with respect to the dual enrollment of the client device 106 with the management service 116 is provided in the discussion of FIGS. 2-4.

The OS platform services environment 109 can be a computing environment that is operated by an enterprise, such as a business or other organization. The OS platform services environment 109 includes a computing device, such as a server computer, that provides computing capabilities. Alternatively, the OS platform services environment 109 can employ multiple computing devices that are arranged in one or more server banks or computer banks. In one example, the computing devices can be located in a single installation. In another example, the computing devices for the OS platform services environment 109 can be distributed among multiple different geographical locations. In one case, the OS platform services environment 109 includes multiple computing devices that together can form a hosted computing resource or a grid computing resource. Additionally, the OS platform services environment 109 can operate as an elastic computing resource where the allotted capacity of computing-related resources, such as processing resources, network resources, and storage resources, can vary over time. In other examples, the OS platform services environment 109 can include or be operated as one or more virtualized computer instances that can be executed to perform the functionality that is described herein.

Various applications or other functionality can be executed in the OS platform services environment 109 according to various examples. Also, various data can be stored in a platform repository 159 that can be accessible to the OS platform services environment 109. The OS platform API's 156 can represent applications or services executed by the OS platform services environment 109 that can facilitate deployment and management of client devices 106 that are enrolled with the management service 116. The OS platform services environment 109 can provide a publicly accessible repository for applications that are distributed to client devices 106, such as an "app store" or other publicly accessible application marketplace. The OS platform services environment 109 can provide device notification API's and services through which the management service 116 can communicate with and manage enrolled client devices 106.

The OS platform repository 159 can provide applications that can be distributed to the client devices 106 as well as information about devices that are managed by the management service 116. In one scenario, the OS platform services environment 109 can be provided by an Android platform maintainer while the enterprise computing environment 103 is provided by a mobile device management vendor. As an example, the application distribution environment 109 can represent the Google Play® Store and Google Play® services that allow for application distribution and management of Android™ devices.

The data stored in the data store 114 within the enterprise computing environment 103 can include one or more device records 123, user data 125, and potentially other data. A device record 123 can store various security settings selected for enforcement on a client device 106 that is enrolled with the management service 116. Accordingly, a device record 123 can include a device identifier associated with a device, such as the client device 106, an indication of the enrollment status of the device, a compliance status, a user associated with a particular device, and potentially other data. The device record 123 can store OEM enrollment data 130 and OS enrollment data 131. The device record 123 can also store an identifier associated with the enrollment of the client device 106 with the management service 116 as a managed device, or an enrollment identifier.

The OEM enrollment data 130 can store data associated with enrollment of the client device 106 as a managed device with the OEM management module 117. The OEM enrollment data 130 can house the UDID of the client device 106, a user account associated with the device, and an organizational group in a directory service with which the client device 106 should be connected.

The OS enrollment data 131 can store data associated with enrollment of the client device 106 as a BYOD device that is enrolled with the OS management module 118. The OS enrollment data 131 can store a UDID associated with the managed workspace 141 of the client device. The OS enrollment data 131 can also store a user account identifier associated with the device, an organizational group in a directory service with which the managed workspace 141 is connected, and other enrollment specific data.

The device record 123 can also specify policies that can be enforced by the management service 116 or by the client device 106. For example, the device record 123 can identify other user specific or device specific policies that are associated with a particular client device 106, such as policies that are related to the location of the client device 106, network settings of the client device 106, applications that are installed on the client device 106, or any other properties associated with the configuration of the client device 106.

User data 133 contains information about users who are associated with client devices 106 that are enrolled with the management service 116. User data 125 can include profile information about a user, authentication information about a user, and other user information. For example, user data 125 can include information about client devices 106 that are associated with a user account of the user, enterprise resources to which a particular user has access, such as email, calendar data, documents, media, applications, network sites, or other resources. The user data 125 can also identify one or more user groups of which a particular user is a member, which can in turn define the access rights of the user to one or more enterprise resources as well as identify which applications should be deployed to a client device 106 associated with the user. To this end, the user data 125 can further identify one or more device identifiers that can uniquely identify client devices 106 that are associated with a user account of the user.

Referring next to FIG. 2, shown is a sequence diagram that provides one example of interactions between components shown in the example networked environment 100 of FIG. 1. FIG. 2 illustrates an example of how the OEM management module 117 can enroll a client device 106 as a managed device. At step 203, an administrator can configure an OEM enrollment of the client device 106 as a fully managed device with the OEM management module 117. In one scenario, configuring enrollment of the device can involve interacting with a user interface, such as a management console, that is provided by the management service 116 to enter device information associated with the enrollment. The device information can include a UDID of the device as well as an organizational group within a directory service with which the client device 106 should be associated.

At step 205, the OEM management component 140 can generate an enrollment request that can be sent to the OEM management module 117 to continue the enrollment process. The enrollment request can be generated in response to an administrator or user installing the OEM management component 140 on the client device 106 and entering authentication credentials or a server address at which the OEM management module 117 can be addressed. The enrollment request can include the UDID of the client device 106 as well as information with which a user associated with the client device 106 can be identified.

In some cases, the administrator can configure and enroll the client device 106 using a staging or temporary user account. In other cases, a user can be issued to the device and can generate the enrollment request by entering his or her user credentials into a prompt generated by the OEM management component 140 on the client device 106. The configuration of the OEM enrollment can also include identifying information about the device and device configuration parameters that should be specified to complete the enrollment with the OEM enrollment module 117. The request to enroll the client device 106 can be received from a workspace configuration component 139 executed by the client device 106. The management service 116 can authenticate the user credentials as well as extract information about the device from the request. In one example, the request can include the operating system type and version, network address, physical location, or other parameters and variables about the client device 106 that can be populated into a device record 123.

At step 207, the OEM management module 117 can identify one or more enrollment parameters based upon enrollment request. The OEM management module 117 can extract a device identifier corresponding to the client device 106 from the enrollment request and associate the device identifier with a device record 123 that corresponds to the client device 106. The OEM management module 117 can also generate an enrollment identifier that it can link to the enrollment of the client device 106. The OEM management module 117 can also identify other configuration parameters associated with the enrollment. The OEM management module 117 can identify the configuration parameters by determining what options are specified for the organizational group to which the device is assigned. For example, the OEM management module 117 can determine which applications, profiles, and policies should be deployed to the device through the OEM management component 140.

At step 209, the OEM management module 117 can deploy applications, profiles, and policies to the client device 106 through the OEM management channel. The applications, profiles, and policies can be specified by the enrollment parameters associated with the organizational group associated with the client device 106. In one example, the OEM management module 117 can instruct the OEM management component 140 to download and install certain applications. Additionally, the OEM management module 117 can transmit security policies, user or network credentials, and other configuration data to the OEM management component 140, which can OEM management component 140 can apply to the client device 106.

At step 211, the OEM management module 117 can deploy a configuration profile that includes a command or instructions to initiate enrollment of the client device 106 with the OS management module 118. The configuration profile, or OS management profile, can include a command or instructions to enroll the client device 106 as a BYOD device with the OS management module 118 using the OS management capabilities of the client device 106. In some scenarios, the OS management profile can include a reference to or a copy of the OS management component 143.

The OS management profile can cause the client device 106 create a managed workspace 141 associated with the OS enrollment data 131 within the device record 123. The OEM management module 117 can install the OS management profile on the client device 106. The installation of the OS management profile and authentication of the user can cause the workspace management component 139 to create the managed workspace 141 and install the OS management component 143. In some implementations, the OS management profile can instruct the operating system 136 to disable a built-in management agent that is bundled with the operating system 136 so that the OS management component 143 can manage the managed workspace 141 on behalf of the management service 116. The OS management component 143 can then finalize enrollment of the client device 106 with the OS management module 118. Accordingly, the client device 106 is enrolled with the management service 116 as a BYOD device. To finalize enrollment of the client device 106 as a BYOD device in addition to a fully managed device, the OS management module 118 can associate the device identifier created for the managed workspace 141 with the device record 123 and enrollment identifier corresponding to the client device 106.

In some examples, a device identifier corresponding to the managed workspace 141 can be generated by the OS management component 143 or workspace management component 139 each time a new user logs into the client device 106 or initiates an enrollment of the client device 106 as a BYOD device with the OS management module 117.

In the event that the previously created managed workspace 141 exists on the client device 106, the workspace management component 139 can delete the managed workspace 141 or the first managed workspace 141. Deletion of the previously created managed workspace 141 can allow multi-user workspaces so that user-specific applications and data can be stored within the managed workspace 141, whereas applications and data that should be accessible to all users can be stored external to the managed workspace 141 and managed by the OEM management component 140. Upon a second user login that is detected on the client device 106, a second managed workspace 141 can be created that is managed by the OS management component 143 on the client device 106.

FIG. 3 illustrates how the client device 106 can be enrolled as a BYOD device and support multi-user use cases. In the scenario shown in FIG. 3, an administrator has already enrolled the client device 106 as a fully managed device that has been enrolled with the OEM management module 117 and on which the OEM management component 140 has been installed. In the scenario shown in FIG. 3, the OEM management component 140 can facilitate enrollment of the client device 106 as a BYOD device with the OS management module 118 as a second enrollment in addition to the enrollment of the client device 106 as a fully managed device.

First, at step 301, the OEM management component 140 detects a user login. The OEM management component 140 can detect a user login on the device and in some scenarios, if the user login represents a user that was not the previously logged in user, the OEM management component 140 can erase a previously stored managed workspace 141 that was stored on the device. If the client device 106 does not have a previously stored managed workspace 141 stored on the device, the OEM management component 140 need not remove it. In some examples, a managed workspace 141 corresponding to a user can be removed when the user logs out of the client device 106.

At step 303, the OEM management component 140 can provide the user login data to the OEM management module 117. The user login data can include a user identifier corresponding to the user. The user login data can also include the device identifier corresponding to the client device 106 and the device identifier that corresponds to the enrollment of the client device 106 with the OEM management module 117. In response to receiving the user login data, the OEM management module 117 can identify the device record 123 that corresponds to the client device 106.

At step 305, the OEM management module 117 can deploy the OS management profile to the client device 106. The OS management profile can be deployed through the OEM management channel to the OEM management component 140. Upon receiving the OS management profile, the OEM management component 140 can install the OS management profile and prompt authentication of the user at step 307. Additionally, the OEM management component 140 or workspace management component 139 can generate a managed workspace 141 and a device identifier that corresponds to the managed workspace 141.

Prompting user authentication of the user at step 307 can be generated by the operating system 136 in response to instructions to enroll the client device 106 as a BYOD device with the OS management module 118 that are contained within the OS management profile. The OEM management component 140 can cause the workspace management component 139 to create a managed workspace and deploy the OS management component 143. Deployment of the OS management component 143 can cause execution of the OS management component 143, which can complete enrollment of the client device 106 as a BYOD device with the OS management module 118.

At step 309, the OS management component 143 obtains user authentication credentials from the user of the client device 106. The process of obtaining the user authentication credentials can also cause the client device 106 to present one or more terms of service to the user that require acceptance before proceeding with the OS management enrollment process.

At step 311, the OS management component 143 transmits an enrollment request to the OS management module 118. The enrollment request can include a user identifier or user credentials of the user as well as a device identifier that corresponds to the managed workspace 141 created on the client device by the workspace management component 139. As noted above, the device identifier associated with the managed workspace 141 is different from the device identifier associated with the client device 106, but the management service 116 can link both device identifiers with the enrollment identifier corresponding to enrollment of the client device 106 with the management service 116.

At step 313, the OS management module 118 can associate the device identifier with the device record 123 that corresponds to the client device 106. Additionally, the OS management module 118 can generate OS enrollment data 131 that is associated with the device record 123. In this way, the client device 106 can be associated with two enrollments with the management service 116. Additionally, the OS management module 118 can manage the applications and data that are stored within the managed workspace 141 using the OS management component 143. In this way, the management service 116 can manage aspects of the device external to the managed workspace 141 through the OEM management channel and manage aspects of the device within the managed workspace 141 through an OS management channel.

Referring next to FIG. 4, shown is a flowchart that provides one example of the operation of a portion of the management service 116. As an alternative, the flowchart of FIG. 4 can be viewed as depicting an example of elements of a method implemented in the enterprise computing environment 103. FIG. 4 illustrates how the management service 116 can facilitate enrollment of a client device 106 as a fully managed device as well as a BYOD device, thereby providing OEM management capabilities and OS management capabilities on a single device. The steps shown in the flowchart of FIG. 4 can be performed by the management service 116, the OEM management module 117, or the OS management module 118.

First, at step 401, the client device 106 can be enrolled as a fully managed device with the OEM management module 117. Enrolling the device as a fully managed device with the OEM management module 117 can require administrator intervention to configure the enrollment and authorize management of the client device 106 by the management service 116. In some examples, the administrator can utilize a staging user to enroll the device with the OEM management module 117. The staging user can be associated with a particular set of applications, profiles, and policies within the management service 116 so that each client device 106 is identically or at least similarly configured by the management service 116. Once enrolled, the management service 116 can deploy applications, profiles, and policies that are installed on the device through the OEM management component 140 on the client device 106 and through the OEM management channel.

Next, at step 403, the management service 116 can provide an OS management profile to the client device 106. The OS management profile can be provided through the OEM management channel to the OEM management component 140 on the client device 106. Providing the OS management profile causes the client device 106 to create a managed workspace 141 on the client device 106. The managed workspace 141 is associated with the enrollment of the client device 106 as a BYOD managed device. Providing the OS management profile further causes the client device 106 to prompt the user to provide his or her user credentials to continue enrollment of the client device 106 as a BYOD managed device in addition to a fully managed device. The OS management component 143 can generate the prompt for the user credentials of the user.

At step 405, the management service 116 can obtain user credentials and a device identifier provided by the user from the client device 106 in response to a first user login. The user credentials can be received from the OS management component 143 deployed by the management service 116 onto the client device 106. The management service 116 can also associate the device identifier with the device record 123 that corresponds to the client device 106 to create a second enrollment for the client device 106 within the device record 123.

At step 407, the management service 116 can finalize enrollment of the client device as a BYOD managed device with the management service 116. In this step, the management service 116 can configure the managed workspace 141 created on the client device 106 with applications, profiles, and policies that can be enforced within the managed workspace 141 by the OS management component 143. Separate applications, profiles, and policies can be installed on and enforced on the client device 106 outside of the managed workspace through the OEM management channel and the OEM management component 140. At this point, the client device 106 is enrolled as a fully managed device and a BYOD device with the management service 116. Now, the management service 116 can detect the login of another user on the client device 106 to provide a multi-user use case.

At step 409, the management service 116 can detect another user login event, or a second user login. In other words, the management service 116 can detect whether a different user logs into the device. The management service 116 can detect the login of another user by obtaining login event data from the OEM management component 140 on the client device 106. If a user login event indicates that a new user has logged into the device, the process can proceed to step 411.

At step 411, the management service 116 can initiate deletion of data within the managed workspace 141, or the first managed workspace 141, that was created on the client device 106. The deletion of data within the managed workspace 141 can be performed by the workspace management component 139, the OS management component 143, or the OEM management component 140 on the client device 106. In one example, the management service 116 can transmit a command to delete the managed workspace 141 to the client device through the OEM management channel. The management service 116 can also initiate creation of a second managed workspace 141 on the device that is associated with the newly logged in user. The management service 116 can cause the creation of a new managed workspace 141, or a second managed workspace, by instructing the OEM management component 140 to cause the workspace management component 139 to create the managed workspace 141 and initiate a third enrollment with the management service 116 as a BYOD device on behalf of the newly logged in user.

Additionally, the workspace management component 139 can create a new UDID for the managed workspace 141, or a third device identifier, that is linked together with the first device identifier within the device record 123 corresponding to the client device 106. In this way, the user space on the client device 106, or the managed workspace 141, can change depending upon the user that is logged into the device, while the areas of the device external to the managed workspace 141 remain unchanged as different users log into the device. Additionally, areas of the device external to the managed workspace 141 remain managed through the OEM management channel by the OEM management module 117.

Thereafter, the process can return to step 405, where the management service 116 obtains user credentials associated with the new user and a device identifier associated with the newly created managed workspace 141. In some scenarios, the enrollment of the client device 106 with the OS management module 118 can be disabled, or the device can be unenrolled. To disable the enrollment, a signature protected activity broadcast can be called on the device that disables the BYOD enrollment of the client device 106. Once disabled, the OEM management component 140 can display a configuration setting that allows the user or administrator to re-enable the BYOD enrollment of the client device 106 with the OS management module 118. In some scenarios, the BYOD enrollment on the client device 106 can be deleted rather than merely disabled.

The sequence diagram of FIGS. 2-3 and the flowchart of FIG. 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 2-3 and the flowchart of FIG. 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The enterprise computing environment 103, the client device 106, or other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data or components that are executable by the one or processors of the processing circuit. The management service 116 or other components can be stored in one or more storage devices and be executable by one or more processors. Also, a data store, such as the data store 114, can be stored in the one or more storage devices.

The management service 116 and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executed by a computing device for facilitating multiple enrollments of a client device as a managed device, wherein the program is configured to cause the computing device to at least:
   initiate a first enrollment of the client device with a management service;
   receive user login data from the client device, the user login data including a device identifier corresponding to the first enrollment of the client device with the management service;
   transmit a management profile to the client device, the management profile comprising a command to initiate a second enrollment of the client device with the management service;
   receive an enrollment request from the client device, the enrollment request comprising a device identifier corresponding to the second enrollment of the client device with the management service; and
   associate the device identifier corresponding to the second enrollment of the client device with the management service with a device record corresponding to the client device.

2. The non-transitory computer-readable medium of claim 1, wherein causing the computing device to initiate the first enrollment of the client device with the management service comprises causing the computing device to at least:
   receive an enrollment request from the client device, wherein the enrollment request comprises a device identifier associated with the client device;
   identify an enrollment parameter associated with the first enrollment of the client device with the management service, the enrollment parameter specifying at least one of an application, a configuration profile, or a policy; and
   deploy the at least one of the application, the configuration profile, or the policy to the client device.

3. The non-transitory computer-readable medium of claim 2, wherein the at least one of the application, the configuration profile, or the policy comprises a management component associated with the second enrollment of the client device with the management service.

4. The non-transitory computer-readable medium of claim 1, wherein the program further causes the computing device to at least identify a device record corresponding to the client device in response to receiving the user login data.

5. The non-transitory computer-readable medium of claim 1, wherein the program further causes the computing device to at least transmit a management command to the client device through a management channel associated with the first enrollment of the client device with the management service.

6. The non-transitory computer-readable medium of claim 5, wherein the management command comprises a command to create a managed workspace within the client device, the managed workspace being associated with the second enrollment of the client device with the management service.

7. A method for providing multiple enrollments of a client device as a managed device, comprising:
   initiating a first enrollment of the client device with a management service;
   receiving user login data from the client device, the user login data including a device identifier corresponding to the first enrollment of the client device with the management service;
   transmitting a management profile to the client device, the management profile comprising a command to initiate a second enrollment of the client device with the management service;
   receiving an enrollment request from the client device, wherein the enrollment request comprises a device identifier corresponding to the second enrollment of the client device with the management service; and
   associating the device identifier corresponding to the second enrollment of the client device with the management service with a device record corresponding to the client device.

8. The method of claim 7, wherein initiating the first enrollment of the client device with the management service comprises:
   receiving an enrollment request from the client device, wherein the enrollment request comprises a device identifier associated with the client device;
   identifying an enrollment parameter associated with the first enrollment of the client device with the management service, the enrollment parameter specifying at least one of an application, a configuration profile, or a policy; and
   deploying the at least one of the application, the configuration profile, or the policy to the client device.

9. The method of claim 8, wherein the at least one of the application, the configuration profile, or the policy comprises a management component associated with the second enrollment of the client device with the management service.

10. The method of claim 7, further comprising identifying a device record corresponding to the client device in response to receiving the user login data.

11. The method of claim 7, further comprising transmitting a management command to the client device through a management channel associated with the first enrollment of the client device with the management service.

12. The method of claim 11, wherein the management command comprises a command to create a managed workspace within the client device, the managed workspace being associated with the second enrollment of the client device with the management service.

13. A system for providing multiple enrollments of a client device as a managed device, comprising:
   at least one computing device; and
   a management service executable by the at least one computing device, wherein the management service causes the at least one computing device to at least:
   initiate a first enrollment of the client device with a management service;
   receive user login data from the client device, the user login data including a device identifier corresponding to the first enrollment of the client device with the management service;

transmit a management profile to the client device, the management profile comprising a command to initiate a second enrollment of the client device with the management service;

receive an enrollment request from the client device, wherein the enrollment request comprises a device identifier corresponding to the second enrollment of the client device with the management service; and associate the device identifier corresponding to the second enrollment of the client device with the management service with a device record corresponding to the client device.

14. The system of claim 13, wherein causing the at least one computing device to initiate the first enrollment of the client device with the management service further causes the at least one computing device to at least:

receive an enrollment request from the client device, wherein the enrollment request comprises a device identifier associated with the client device;

identify an enrollment parameter associated with the first enrollment of the client device with the management service, the enrollment parameter specifying at least one of an application, a configuration profile, or a policy; and deploy the at least one of the application, the configuration profile, or the policy to the client device.

15. The system of claim 14, wherein the at least one of the application, the configuration profile, or the policy comprises a management component associated with the second enrollment of the client device with the management service.

16. The system of claim 13, wherein the management service further causes the at least one computing device to at least identify a device record corresponding to the client device in response to receiving the user login data.

17. The system of claim 13, wherein the management service further causes the at least one computing device to at least transmit, to the client device through a management channel associated with the first enrollment of the client device with the management service, a command to create a managed workspace within the client device, the managed workspace being associated with the second enrollment of the client device with the management service.

* * * * *